United States Patent
Huo et al.

(10) Patent No.: US 10,168,353 B2
(45) Date of Patent: Jan. 1, 2019

(54) APPARATUS AND METHODS FOR INVESTIGATING A SAMPLE SURFACE

(71) Applicant: NANYANG TECHNOLOGICAL UNIVERSITY, Singapore (SG)

(72) Inventors: Fengwei Huo, Singapore (SG); Jin Wu, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 15/575,348

(22) PCT Filed: May 12, 2016

(86) PCT No.: PCT/SG2016/050220
§ 371 (c)(1),
(2) Date: Nov. 18, 2017

(87) PCT Pub. No.: WO2016/186573
PCT Pub. Date: Nov. 24, 2016

(65) Prior Publication Data
US 2018/0149673 A1    May 31, 2018

(30) Foreign Application Priority Data
May 19, 2015    (SG)    .............................. 10201503936T

(51) Int. Cl.
*G01Q 20/02*    (2010.01)
*G01Q 10/06*    (2010.01)
(Continued)

(52) U.S. Cl.
CPC ........... *G01Q 10/065* (2013.01); *G01Q 20/02* (2013.01); *G01Q 60/22* (2013.01); *G01Q 70/06* (2013.01); *G01Q 70/14* (2013.01); *G02B 21/002* (2013.01)

(58) Field of Classification Search
USPC ................................. 850/1–6, 8, 55, 62, 63
See application file for complete search history.

(56) References Cited

U.S. PATENT DOCUMENTS

| | | | | |
|---|---|---|---|---|
| 2001/0055151 A1* | 12/2001 | Ookubo | ................. | G01Q 10/06 359/368 |
| 2005/0023481 A1* | 2/2005 | Kamps | .................. | B82Y 35/00 250/432 R |

(Continued)

FOREIGN PATENT DOCUMENTS

| WO | WO2014011954 A1 | 1/2014 |
|---|---|---|
| WO | WO2016186573 A1 | 11/2016 |

OTHER PUBLICATIONS

Foreign Communication From a Related Counterpart Application, International Search Report and Written Opinion dated Jun. 29, 2016, International Application No. PCT/SG2016/050220, filed on May 12, 2016.

*Primary Examiner* — Bernard Souw

(57) ABSTRACT

An apparatus for investigating a sample surface is disclosed. The apparatus comprises: a probe array comprising a substrate and a plurality of probe tips extending from the substrate, the probe tips comprising a transparent and deformable material and configured to contact the sample surface; an actuator configured to move the probe array towards the sample surface; a light source configured to illuminate the probe tips with an illumination through the substrate; and an image capture device arranged to detect a change in intensity of the illumination reflected from the probe tips.

14 Claims, 14 Drawing Sheets

(51) Int. Cl.
  *G01Q 60/22* (2010.01)
  *G01Q 70/06* (2010.01)
  *G01Q 70/14* (2010.01)
  *G02B 21/00* (2006.01)

(56) References Cited

U.S. PATENT DOCUMENTS

2007/0295064 A1* 12/2007 Degertekin ............ B82Y 35/00
   73/105
2011/0132220 A1*  6/2011 Mirkin ................... B82Y 10/00
   101/483
2011/0305996 A1* 12/2011 Mirkin ................... G03F 7/2051
   430/324
2012/0128882 A1*  5/2012 Mirkin ................... G03F 7/0002
   427/256

* cited by examiner

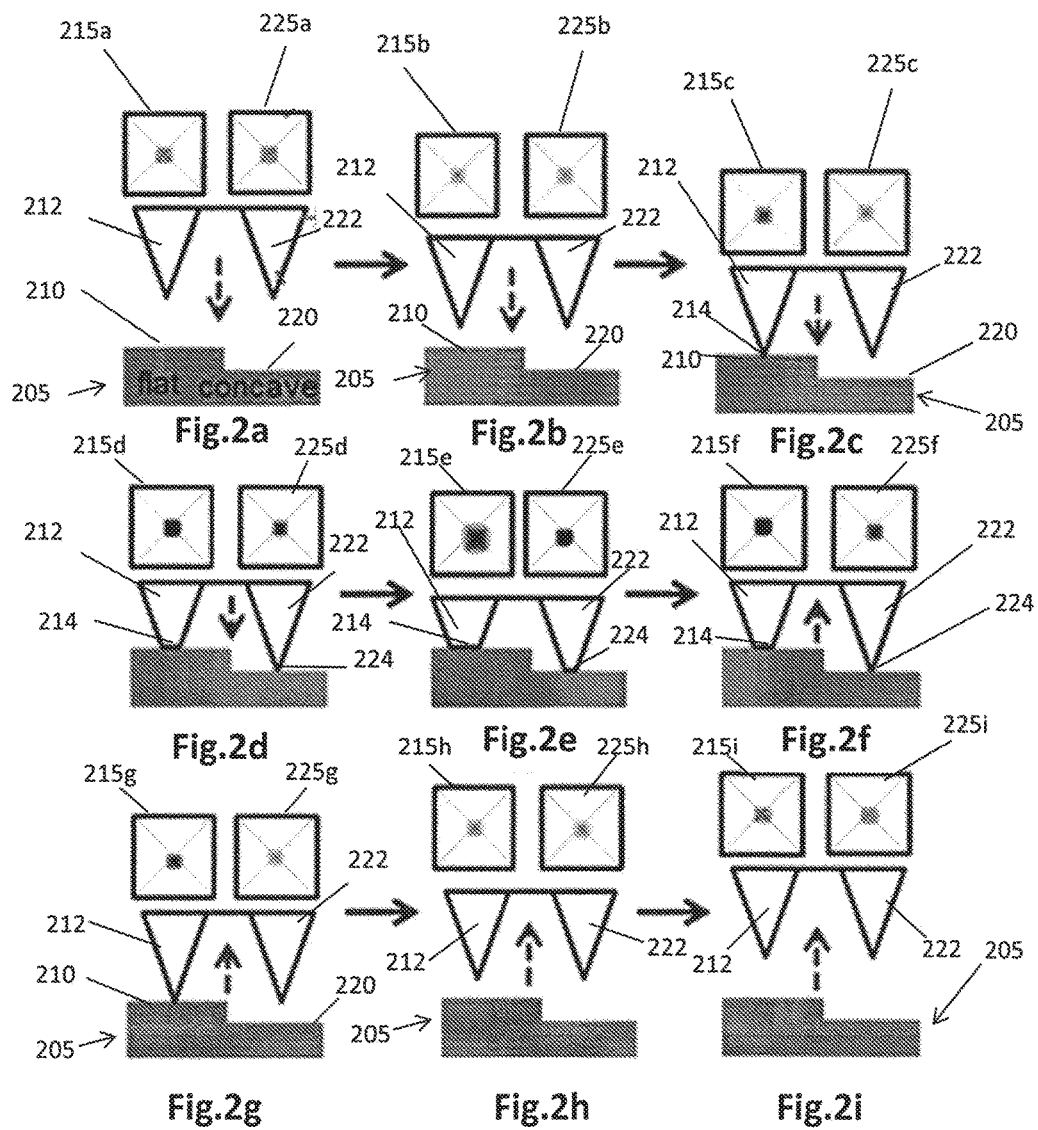

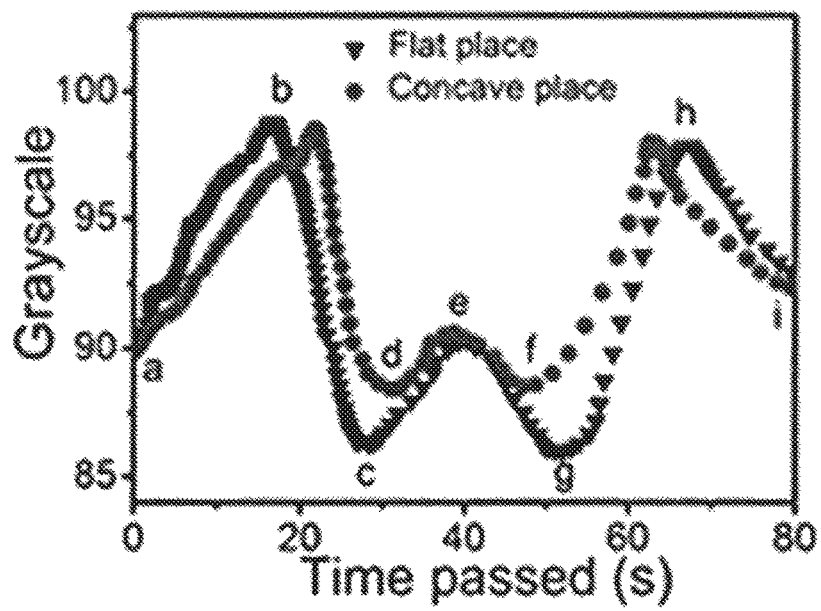
Fig.2j
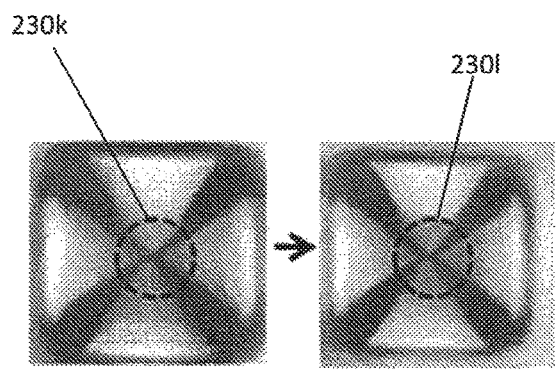
Fig.2k    Fig.2l
Fig.2n    Fig.2m

APPARATUS AND METHODS FOR INVESTIGATING A SAMPLE SURFACE

CROSS-REFERENCE TO RELATED APPLICATIONS

The present application is a filing under 35 U.S.C. 371 as the National Stage of International Application No. PCT/SG2016/050220, filed May 12, 2016, entitled "APPARATUS AND METHODS FOR INVESTIGATING A SAMPLE SURFACE," which claims the benefit of and priority to Singapore Application No. 10201503936T, filed with the Intellectual Property Office of Singapore on May 19, 2015, both of which are incorporated herein by reference in their entirety for all purposes.

FIELD OF THE INVENTION

Embodiments of the present invention relate to the investigation and imaging of a sample surface. In particular, embodiments of the present invention relate to the determination of properties such as the topology and surface chemistry of a sample surface.

BACKGROUND

Throughout history, breakthroughs in the field of microscopy often brought about groundbreaking advancement in scientific research. For example, with the development of scanning tunneling microscopy (STM), electron microscopes (EM) and related techniques, nanotechnology has become an emerging technology with enormous potential to alter our way of life in decades ahead. More than 400 years ago, the first optical microscope was invented to visualize objects invisible to the naked eyes. Until now, the optical microscope remains one of the most widely used microscopes in both industry and academia among three main branches of microscopes: optical microscope, EM (both the scanning electron microscope, SEM and the transmission electron microscope, TEM) and the family of scanning probe microscope (SPM). Optical microscopes (OM) offer the merits of fast speed, large-area imaging and ease of sample preparation; however, the diffraction barrier prevents conventional optical microscopes from distinguishing the nanostructures below 200 nm using visible light.

Near-field scanning optical microscopy (NSOM) has circumvented the diffraction limit by bringing the tips to the proximity of sample surface of interest in the region within ~10 nm of the tip or nano-antenna, however it is restricted to a small scanning area. Recently, the diffraction limit has been successfully surpassed by super-resolution fluorescence microscopy including stimulated emission depletion microscopy (STED) or reversible saturable optical fluorescence transitions (RESOLFT), photo-activation localization microscopy (PALM) or fluorescence PALM (FPALM), saturated structured illumination microscopy (SSIM) and stochastic optical reconstruction microscopy (STORM). Although the resolution as high as 20 nm has been achieved by the aforementioned methodologies in life science researches, the requirement of fluorophores precludes its applications in the samples which cannot be labeled with fluorophores, such as silicon based semiconductors. On the other hand, EM employs short-wavelength electron beams to illuminate samples and therefore achieves the resolution better than 50 pm for TEM. Nevertheless, it is expensive to build and maintain. SPM such as STM and atomic force microscope (AFM) acquires topographical image and other images by utilizing a physical probe to touch and feel specimen surfaces directly. As such, images containing a variety of surface properties such as topographical, chemical, electrostatic, magnetic and thermal properties, etc., can be presented directly with sub-molecular resolution.

However, the key problems with SPM are the slow scanning speed, small scan size and small depth of field. For example, a commercial AFM takes several minutes to obtain a high-quality image with the maximal scan size less than 80 by 80 $\mu m^2$. Although cantilevers with high resonant frequency are being developed to increase the AFM scanning speed since more than 15 years ago, the serial nature of single tip based design restricted the scanning area within 40 by 40 $\mu m^2$ in one pass until now. Parallel imaging with multiple tips has been enabled by utilizing an integrated piezo-resistive sensor and integrated ZnO actuator, whereby the noise limit the resolution. Further, the complex design and setup make it difficult to be accessed by most researchers. Thus, up to date, a simple imaging technology which enables topographical imaging with sub-diffraction resolution over large areas (up to millimeter scale) remains challenging.

Recently, the development of polymer pen lithography (PPL) has increased the throughput of traditional single tip based dip pen nanolithography by over three orders of magnitude by utilizing a tip array comprised of hundreds of polydimethylsiloxane (PDMS) tips to 'write' ink on substrate surfaces simultaneously.

For AFM, the specimen surface information is reflected by the deflection or torsion of a flexible cantilever, which are detected by monitoring the tiny movement of a laser beam projected on the back side of the cantilever. Nevertheless, multiple laser beams for multiple tips parallel imaging are difficult to implement since multiple lasers may interfere with each other in a small confined space.

Since microscopy provides smart "eyes" for researchers to visualize and explore micro/nanomaterials, developing a facile microscopy which enables large-area imaging without the restriction of diffraction limit is a longstanding goal in nanotechnology community. Although the advancement of microscopy has revolutionized the scientific research in many fields in the past, as described above, state-of-the-art microscopy imposes tradeoffs between throughput, resolution and sample surface information acquired.

SUMMARY OF THE INVENTION

According to a first aspect of the present invention there is provided an apparatus for investigating a sample surface. The apparatus comprises: a probe array comprising a substrate and a plurality of probe tips extending from the substrate, the probe tips comprising a transparent and deformable material and configured to contact the sample surface; an actuator configured to move the probe array towards the sample surface; a light source configured to illuminate the probe tips with an illumination through the substrate; and an image capture device arranged to detect a change in intensity of the illumination reflected from the probe tips.

Embodiments of the present invention provide a new imaging technique, termed Parallel scanning optical microscopy (PSOM). Embodiments of the present invention are capable of acquiring topographical images over 0.15 square millimeter areas with sub-diffraction resolution using a tip array as many as 91 tips. PSOM merges the large-area imaging merit of conventional optical microscopy and high vertical resolution offered by scanning probe microscopy. In embodiments PSOM employs white light reflection intensity change (grayscale change) at the apexes of elastomeric tips as feedback signal to explore surface information, which allows for a tip array parallel scanning simultaneously over millimeter-scale areas. Besides topographical imaging with currently achieved vertical resolution of 30 nm, it is also feasible to impart functionalities to the elastic tips for acquiring other surface information, such as surface chemistry.

In an embodiment the probe tips comprise an elastomer. The probe tips may comprise polydimethylsiloxane (PDMS).

In an embodiment the actuator is configured to move the probe array towards the sample surface and away from the sample surface.

In an embodiment the apparatus further comprises an XY scanning stage configured to scan the probe array parallel to the sample surface.

In an embodiment the probe tips of the probe array have a length of between 1 µm and 500 µm.

In an embodiment the actuator is configured to move the probe array towards and/or away from the sample surface at a speed in the range of 0.1 µm/s to 2000 µm/s.

In an embodiment the actuator is configured to move the probe array towards and/or away from the sample surface at through a distance of 0 µm to 50 µm.

According to a second aspect of the present invention there is provided a method of investigating a sample surface. The method comprises arranging a probe array over the sample surface, the probe array comprising a substrate and a plurality of probe tips from the substrate, the probe tips comprising a transparent and deformable material and configured to contact the sample surface; illuminating the probe tips with an illumination through the substrate; moving the probe array relative to the sample surface; detecting a timing of a change in intensity of the illumination reflected from each probe tip of the plurality of probe tips; and determining a property of the sample surface from the timing of the change in intensity of the illumination reflected from each probe tip of the plurality of probe tips.

In an embodiment the property of the sample surface is a topology of the sample surface.

In an embodiment the property of the sample surface is a surface chemistry of the sample surface.

In an embodiment moving the probe array relative to the sample surface comprises moving the probe array towards the sample surface and moving the probe array away from the sample surface and wherein detecting a timing of a change in intensity of the illumination reflected from each probe tip of the plurality of probe tips comprises detecting a timing of a first change in intensity corresponding to that probe tip coming into contact with the sample surface and detecting a timing of a second change in intensity corresponding to that probe tip coming out of contact with the probe surface.

In an embodiment the method further comprises scanning the probe array across the sample surface.

In an embodiment detecting a timing of change in intensity of the illumination reflected from each probe tip of the plurality of probe tips comprises monitoring an area corresponding to each probe tips of less than 25×25 pixels.

BRIEF DESCRIPTION OF THE DRAWINGS

In the following, embodiments of the present invention will be described as non-limiting examples with reference to the accompanying drawings in which:

FIGS. 2a to 2m illustrate a process of determining surface topology according to an embodiment of the present invention;

DETAILED DESCRIPTION

Embodiments of the present invention provide a new imaging technique, termed Parallel scanning optical microscopy (PSOM). PSOM merges the large-area imaging merit of conventional optical microscopy and high vertical resolution offered by scanning probe microscopy. For the first time, PSOM employs white light reflection intensity change (grayscale change) at the apexes of probe tips as a feedback signal to explore surface information, which allows for parallel scanning simultaneously over millimeter-scale areas.

Besides topographical imaging it is also feasible to impart functionalities to the elastic tips for acquiring other surface information, such as surface chemistry.

Figure 1:
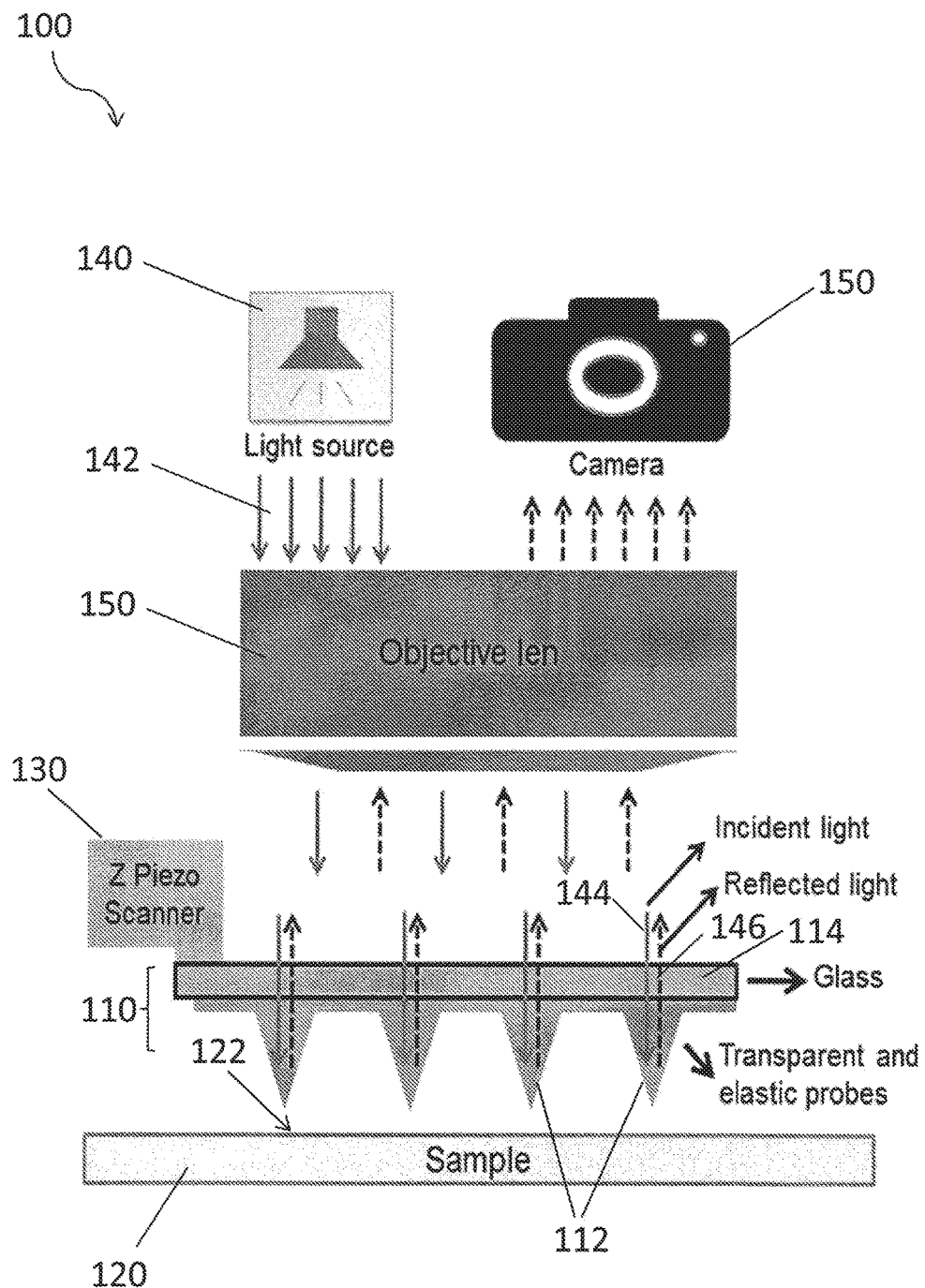
FIG. 1 shows a parallel scanning optical microscopy (PSOM) apparatus according to an embodiment of the present invention.

FIG. 1 shows a parallel scanning optical microscopy (PSOM) apparatus according to an embodiment of the present invention. As shown in FIG. 1, the apparatus 100 comprises a probe array 110 which is positioned over a sample 120. The probe array 110 comprises a plurality of probe tips 112 which extend from a substrate 114. The probe tips 112 are formed from a transparent and deformable material. In this embodiment, the substrate is formed from glass. The probe tips 112 extend from the substrate 114 towards a surface 122 of the sample 120.

An actuator 130 which in this embodiment is a Z piezo scanner is configured to move the probe array 110 towards and away from the surface 122 of the sample 120. A light source 140 is arranged to provide an illumination 142 to the probe tips 112. An objective lens 150 directs the illumination 142 from the light source 140 as incident light 144 on the probe tips 112. The reflected light 146 from the probe tips is directed by the objective lens to an image capture device 150 which in this embodiment is a camera.

In parallel scanning optical microscopy (PSOM), large-area white light, rather than individual small laser beam, is used to illuminate the whole array of probe tips 112. The probe array may have an area as large as several square millimeters. This greatly extends the scanning areas of traditional single tip based SPM.

The white light reflection intensity change of each individual probe tip 112 is exploited as feedback signal to acquire surface information about the surface 122.

In embodiments PSOM utilizes the physical contact between the elastomeric tips 112 and the sample surface 122 to detect sample surface information. This allows for the acquisition of topographical images directly.

In use, the probe array 120 is moved in the vertical direction by the actuator 130. The probe array 120 moves from the same beginning position to the same end position in the vertical direction for each tip and each scanned point. By scanning on the sample surface 122 in a point by point and line by line manner, an image can be obtained.

In an embodiment, the probe tips 112 are formed from polydimethylsiloxane (PDMS). This provides transparent and elastomeric probe tips 112.

Backlighting the probe tip array 110 with incident light 142 results in the reflection from the internal sidewalls of the probe tips 112 as well as that from sample surface. The reflected light intensity can be quantified by the grayscale value in the optical images captured by the image capture device 160 such as a charge coupled device (CCD) camera. As shown in FIG. 1, the image capture device 160 is positioned above the backside of the tip array 110. When the apexes of the probe tips 112 contact or leave the sample surface 122, the intensity of reflection from the probe tips 112, especially from the apex of each probe tip 112, enhances or decreases significantly due to deformation of the probe tips 112. Such sudden change of grayscale can be used as a feedback signal to identify the critical contact and separation positions between probe tips 112 and the sample surface 122. After contact with the sample surface 122, the probe tips 112 are moved further until they reach the end positions with the smallest Z piezo extension.

Subsequently, the probe tips 112 are retracted from the sample surface 122 until they return to the beginning position in the vertical direction. The elastomeric probe tips 112 deform from the contact positions to the separation positions. Since the movement speed of probe tips 112 is constant, the time from the critical contact position to the critical separation position differs for features with different height. The time difference can be utilized to calculate the feature height and therefore present the topographical image of sample surfaces. As the interaction process between tips and sample surface may be influenced by other forces such as chemical force, other surface information such as surface chemical information can be obtained as well.

FIGS. 2a to 2m illustrate a process of determining surface topology according to an embodiment of the present invention. FIGS. 2a to 2i show optical images for probe tips approaching an in contact with a sample surface.

As shown in FIG. 2a, a sample surface 205 has a flat part 210 and a concave part 220. The flat part 210 is higher than the concave part 220. A first probe tip 212 is above the flat part 210 and a second probe tip 222 is above the concave part 220. A first optical image 215a is obtained from light reflected from the first probe tip 212 and a second optical image 225a is obtained from the light reflected by the second probe tip 222.

As shown in FIG. 2b, the probe array comprising the first probe tip 212 and the second probe tip 222 is moved towards the sample surface 205. As shown in FIG. 2b, neither the first probe tip 212 nor the second probe tip 222 is in contact with the sample surface 205. However, because the first probe tip 212 and the second probe tip 222 are closer to the sample surface 205, the reflection from the sample surface 205 is greater. Therefore, the first image 215b and the second image 225b in the configuration shown in FIG. 2b have a higher intensity than first image 215a and the second image 225a in the configuration shown in FIG. 2a.

As the probe array moves closer to the sample surface 205, the first probe tip 212 comes into contact with the flat part 210 of the sample surface 205. This configuration is shown in FIG. 2c.

As shown in FIG. 2c, the apex 214 of the first probe tip 212 is contacts the flat part 210 of the sample surface 205. The result of this is that the first image 215c becomes darker. Since the second probe tip 222 is not in contact with the concave part 220 of the sample surface 205, the second image 225c remains light.

The probe array is then moved closer to the sample surface 205 and the second probe tip 222 comes into contact with the concave part 220 of the sample surface 205. This configuration is shown in FIG. 2d.

As shown in FIG. 2d, the apex 214 of the first probe tip 212 becomes deformed from contact with the flat part 210 of the sample surface. The first image 215d thus shows the deformation in the first probe tip 212. The apex 224 of the second probe tip 222 comes into contact with the concave part 220 of the sample surface 205. Thus there is an abrupt change in the intensity of the second image 225d compared with the second image 225c when the second probe tip 222 is not in contact with the sample surface 205.

As the probe array moves closer to the sample surface 205, the apex 214 of the first probe tip 212 becomes further deformed and the apex 224 of the second probe tip 222 becomes deformed. This configuration is shown in FIG. 2e.

As shown in FIG. 2e, the intensity of reflected light in the first image 215e increases compared with the intensity in the configuration shown in FIG. 2d. This is because the deformed apex 214 reflects more light. The apex 224 of the second probe tip 222 is also deformed, but not to the same extent as the apex 214 of the first probe tip 212.

The probe array is then moved away from the sample surface 205.

As shown in FIG. 2f, the probe array is moved through a position in which the apex 224 of the second probe tip 222 is in contact with the concave part 220 of the sample surface 205. The apex 214 of the first probe tip 212 is deformed by the flat part 210 of the sample surface 205.

As the probe array moves away from the sample surface 205, the configuration changes to the situation shown in FIG. 2g in which the first probe tip 212 is in contact with the flat part 210 of the sample surface 205 and the second probe tip 222 has moved out of contact with the concave part 220 of the sample surface 205. As shown in FIG. 2g, the first image 215g and the second image 225g correspond to the first image 215c and the second image 225c shown in FIG. 2c.

The probe array then moves further away from the sample surface 205. As shown in FIG. 2h, the first probe tip 212 and the second probe tip 222 are out of contact with the sample surface 205. The first image 215*h* and the second image 225*h* correspond to the first image 215*b* and the second image 225*b* shown in FIG. 2*b*.

Finally, the probe array is moved further from the sample surface 205. As shown in FIG. 2*i*, the first probe tip 212 and the second probe tip 222 are both further from the sample surface 205. As shown in FIG. 2*i*, the intensity of the first image 215*i* and the intensity of the second image 225*i* are reduced compared to the first image 215*h* and the second image 225*h* shown in FIG. 2*h* since the reflection from the sample surface 205 is lower.

FIG. 2*j* is a graph showing experimentally obtained greyscale intensity as a function of time in an apparatus according to an embodiment of the present invention. The graph shown in FIG. 2*j* represents a scan through the configurations shown in FIGS. 2*a* to 2*i*. Since the probe array moves at a constant speed, the time passed which is the x-axis of the graph in FIG. 2*j* can be assumed to be proportional to position of the probe array relative to the sample surface. The letters a to i shown in FIG. 2*j* represent the configurations in FIGS. 2*a* to 2*i* described above. As explained above, the probe array moves towards the sample surface until the configuration shown in FIG. 2*e* occurs and then moves away from the sample surface. As can be seen in FIG. 2*j*, this change of direction occurs at around 40 seconds into the scan.

As shown in FIG. 2*j*, the shapes of the obtained grayscale curves are highly similar and reproducible for each scanned point and each probe tip since all tips experience the following processes in the vertical direction during one point measurement. As the probe tips approach the surface prior to contact, the reflected light intensity increases because of the increased reflection from the sample surface as the probe tips move closer to the sample surface. When the probe tips contact the sample surface, there is a sudden change. When the probe tips contacted with sample surface, the reflection intensity increased suddenly. Therefore, a sharp peak (peaks c and d in FIG. 2*j*) appears which could be employed to determine the critical contact position. With further extension of Z piezo scanner after contact, the elastomeric tips deformed. Hence, the contacted areas enlarged gradually and the contact between PDMS tips surface and sample surface became better. This resulted in the enhancement of light reflection and the increment of grayscale until Z piezo extension became the smallest (peak e in FIG. 2*j*).

FIGS. 2*k* to 2*n* are backside images captured by a CCD camera of a selected probe tip in an embodiment of the present invention. FIG. 2*k* shows the captured image when the probe tip is not in contact with the sample surface. The apex region 230*k* of the probe tip is circled. FIG. 2*l* shows the capture image when the probe tip has just come into contact with the sample surface. In the following description this configuration is referred to as 'critical contact'. As shown in FIG. 2*l*, the apex region 230*l* of the image is darker due to the contact between the probe tip and the sample surface. FIG. 2*m* shows the capture image when the probe tip is deformed by contact with the sample surface. As shown in FIG. 2*m*, the apex region 230*m* of the image become lighter due to the deformation of the probe tip. FIG. 2*n* shows the capture image when the probe tip is moving out of contact with the sample surface. In the following description, this configuration is referred to as 'critical separation'. As shown in FIG. 2*n*, the apex region 230*n* of the image becomes darker. As described above, there is a change in the intensity when the probe tip comes into contact with the sample surface and when the probe tip moves out of contact with the sample surface. In embodiments of the present invention, this change of intensity is detected for each of the probe tips in the array when the probe array is moved towards and/or away from the sample surface. Thus information on the topology of the sample surface can be determined from the timing of the changes in measured intensity.

As described above, after the Z scanner had the smallest Z piezo extension in the configuration shown in FIG. 2*e*, the deformed probe tips are retracted from the sample surface. Since the movement of the probe tips during the approach to the sample surface and the retraction from the sample surface is reversible, the grayscale-time curve is symmetrical. This can be seen in FIG. 2*j*: the curve during retraction (line segment e-i in FIG. 2*j*) is the reverse of that in the approach process (line segment a-e).

Figure 3A:
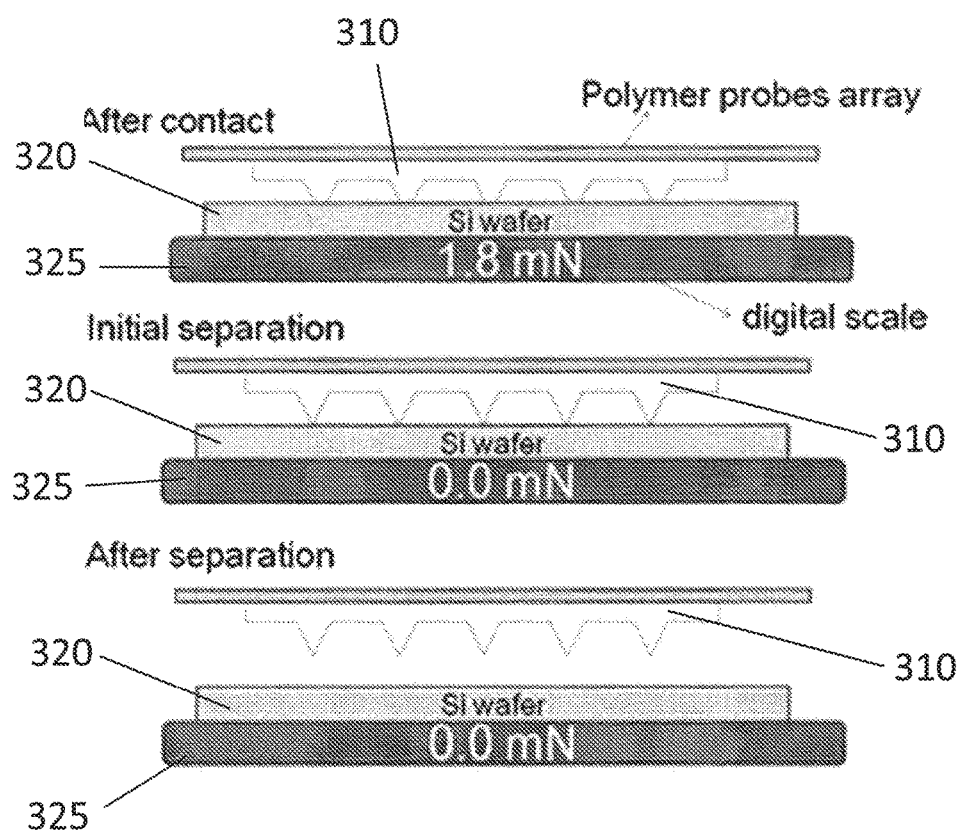
FIGS. 3a to 3c illustrate the confirmation of the relationship between the greyscale intensity features with a force-Z piezo extension curve for embodiments of the present invention.
Figure 3B:
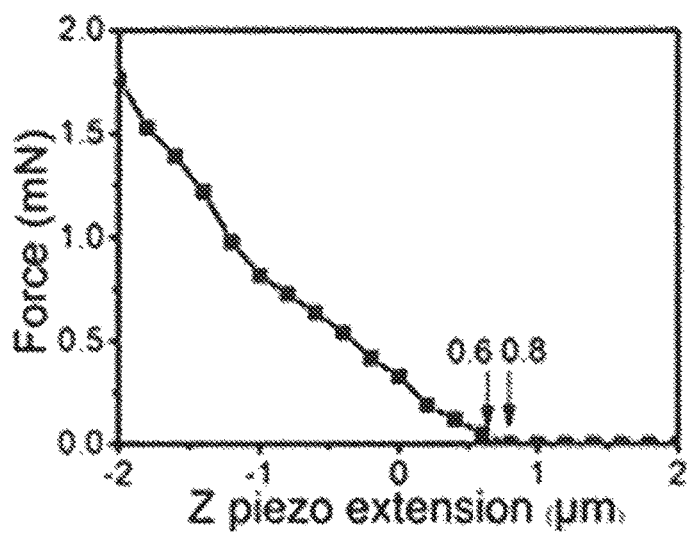
Figure 3C:
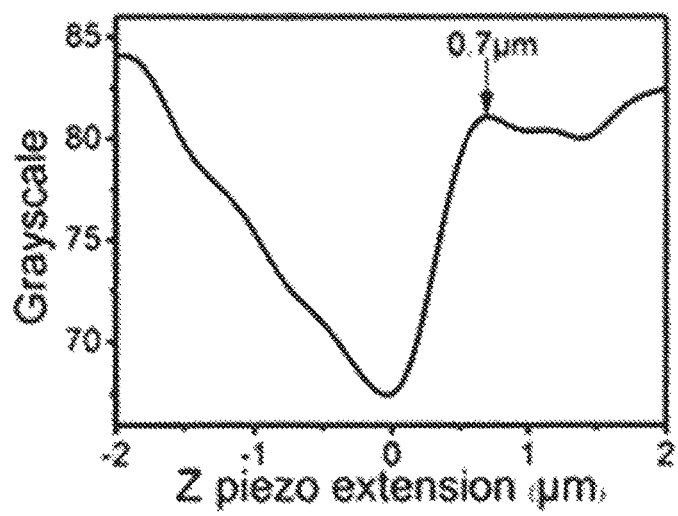

FIGS. 3*a* to 3*c* illustrate the confirmation of the relationship between the greyscale intensity features with a force-Z piezo extension curve.

FIG. 3*a* shows a schematic of the experimental arrangement. As shown in FIG. 3*a*, the probe array 310 was placed over a silicon wafer which forms the sample 320. The silicon wafer sample 320 was placed on a digital scale 325 to measure the force applied to the sample 320 by the probe array 310 and determine the point at which separation of the probe array 310 from the sample 320 occurred.

As shown in FIG. 3*a*, when the probe array 310 was in contact with the sample 320, the digital scale showed a positive reading. The point of initial separation was identified as the time when the digital scale 325 showed a zero reading.

FIG. 3*b* shows the force measured by the digital scale 325 against the Z piezo extension distance. As can be seen in FIG. 3*b*, the force is reaches zero at an extension of between 0.6 and 0.8 μm.

FIG. 3*c* shows the greyscale reading at from the image capture device corresponding to a selected probe tip of the probe array. As shown in FIG. 3*c* there is a clear peak at 0.7 μm.

As described above, during the tip array retraction process, it was found that the force between tip array and sample surface changed from 0.05 to 0 mN when Z piezo extension increased from 0.6 to 0.8 μm. As can be seen from FIG. 3*b*, in principle, the Z piezo extension of the critical separation position in the vertical direction should be in the range of 0.6-0.8 μm. As shown in FIG. 3*c*, it was found that the separation peak was located at the vertical position with the Z piezo extension of 0.7 μm by using grayscale-Z piezo extension curve with the aforementioned method. Since the Z piezo extension of 0.7 μm obtained from grayscale curve fell in the above mentioned range, it confirmed that the peaks identified on the grayscale curves (peaks f and g in FIG. 2*j*) were separation peaks. As the contact process was reversible to the separation process, the contact peaks positions were also proved.

One unique characteristic making PSOM distinctive from conventional scanning probe microscopy is the high-throughput imaging capability brought by a probe array consisting of hundreds of probe tips, since all the probe tips with their corresponding optical images collected by the camera participated in imaging.

Figure 4:
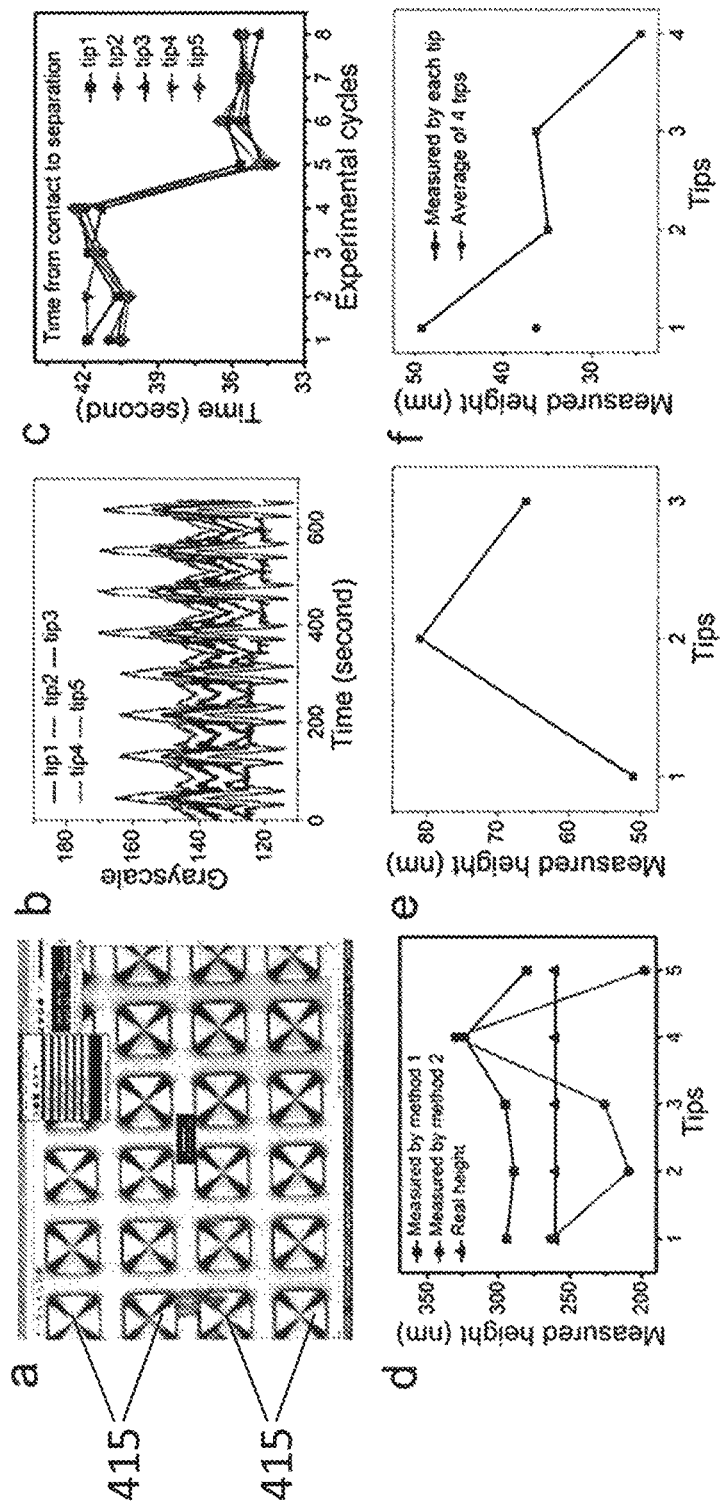
FIGS. 4a to 4f illustrate results obtained in an embodiment of the present invention using a probe array with 24 probe tips.

FIGS. 4*a* to 4*f* illustrate results obtained in an embodiment of the present invention using a probe array with 24 probe tips. As a proof-of-concept, five tips in a tip array were chosen as a representative of 24 tips on the screen to demonstrate their parallel measurement of sub-diffraction feature height simultaneously. FIG. 4*a* shows a screen showing the images 415 of each of the 24 probe tips. FIG.

4b shows the greyscale intensity as a function of time from the beginning of a first cycle for 8 consecutive cycles for 5 selected probe tips of the probe array. Each of the cycles involved moving the probe tips of the probe array into contact with the sample surface and then out of contact with the sample surface. In the first four cycles, the probe array was brought into contact with the same flat parts of the sample surface. Subsequently, the probe array was moved to contact with a concave part of the sample surface for the second four cycles.

FIG. 4c shows the time from contact to separation as a function of experimental cycle for each of the selected probe tips. As shown in FIG. 4c, for the first four experimental cycles, the time between contact and separation is between 40 and 42 seconds for each of the probe tips. For the second four experimental cycles, the time between contact and separation is between 34 and 36 seconds. The time period from contact positions to separation positions on the flat places was much longer than that on the concave places for all selected five tips.

A first method of calculating the feature height is to use the time difference between contact and separation. A second method of calculating the feature height is to use the time difference from beginning position to the critical contact positions between the two places.

FIG. 4d shows a comparison of the feature height calculated by different methods and the real height of 260 nm for each of 5 selected probe tips. As shown in FIG. 4d, the calculated feature height as within an error of 60 nm of the true feature height.

FIG. 4e shows the measured height of a 55 nm feature by three selected probe tips. As shown in FIG. 4e, the measured height is within 15 nm of the true feature height.

FIG. 4f shows the measured height of a 35 nm feature using 4 selected probe tips. As shown in FIG. 4f, the average of the 4 probe tips is around 36 nm.

As described above with reference to FIGS. 4e and 4f, features with a height of 55 and 30 nm could be measured as with the error of 30 and 18 nm respectively using this strategy. As shown in FIG. 4b, the grayscale changed regularly for each tip in each experimental cycle, demonstrating that the grayscale-time curves were reproducible.

FIGS. 5a to 5l illustrate the use of parallel scanning with 91 tips to obtain three dimensional images over a large area. By scanning across the features point by point along a straight line, the line profiles of features could be obtained.

Figures 5A, 5B, 5C, 5D, 5E, 5F, 5G, 5H, 5I:
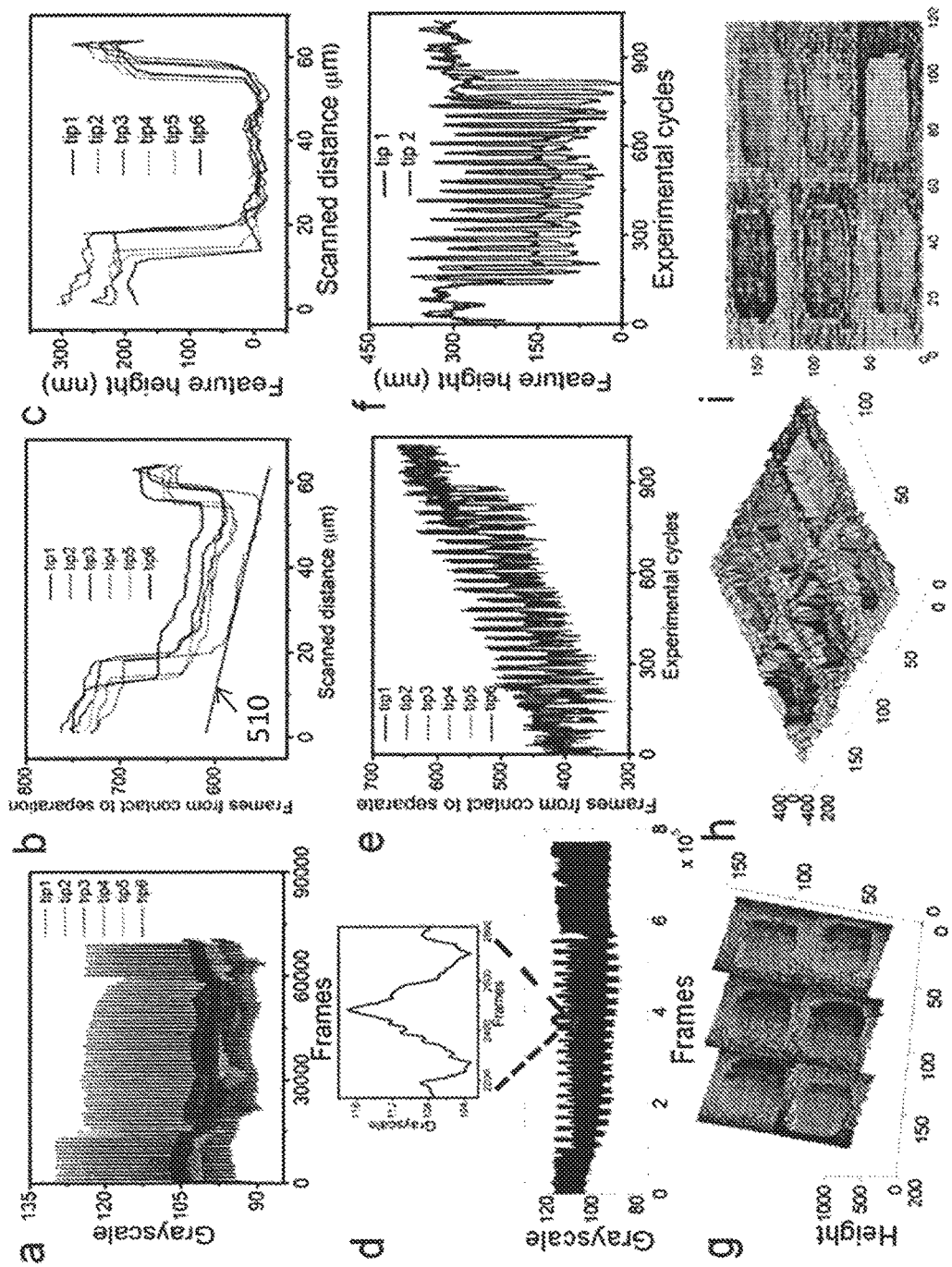
FIGS. 5a to 5l illustrate the use of parallel scanning with 91 tips to obtain three dimensional images over a large area in an embodiment of the present invention.

FIG. 5a shows the greyscale intensity against frame number for 6 probe tips. FIG. 5b shows the calculated number of frames passed from the contact peaks to the separation peaks as a function of the scanned distance. As shown in FIG. 5b, the number of frames from the critical contact position to the critical separation position could be calculated for each tip at each scanned point. As shown in FIG. 5c, the difference between the abovementioned number of frames at flat place and that in 40 $\mu m^2$ square holes with the depth of 260 nm could be used to calculate the feature height.

During the scanning process, although the closed-loop of piezo scanners was employed to alleviate thermal drift, the thermal drift of Z piezo scanner was still inevitable, resulting in the appearance of slopes on the background of grayscale curves for different scanned points. These slopes can be seen in the gradual change in greyscale intensity in FIG. 5a and in the line 510 labelled in FIG. 5b. The error caused by thermal drift can be calibrated by flattening the curves, as what has been largely used in AFM image processing.

By linear fitting of the original curves, the background line could be obtained. After subtracting the background lines from the original lines with slopes, the slopes resulting from Z piezo scanner thermal drift could be diminished and the topographical lines profile of the features could be obtained as shown in FIG. 5c. The measured height and width of the square features approached the real height of 260 nm and the real width of 40 µm respectively for all of the selected six tips.

After obtaining the line profiles by scanning point by point, the tip array was scanned across an area in a line by line fashion on specimen surface to present a 3D topographical image. The scanned areas by individual tip were stitched together to present a large-area image. FIGS. 5d to 5i show the results of a process of scanning each probe tip of the array over 32 points×32 points over an area of 60 µm×60 µm FIG. 5d shows the obtained greyscale curves as a function of frame number for one selected probe tip in one experimental pass. The inset figure is the greyscale frame curves of one experimental cycle selected from the main figure.

FIG. 5e shows the calculated frame numbers passed from the contact peaks to the separation peaks as a function of experimental cycle for each of the selected 6 probe tips.

FIG. 5f shows the calculated feature height as a function of experimental cycle from the data shown in FIG. 5e for two selected probe tips.

FIG. 5g shows a 3D topological image of a selected area of 120 µm×180 µm. The data shown in FIG. 5g was obtained from six probe tips scanning in parallel and was presented by a matlab program.

FIG. 5h shows a flattened version of the 3D topological image shown in FIG. 5g.

FIG. 5i shows a 2D topological image corresponding to the 3D topological image shown in FIGS. 5g and 5h.

Figures 5J, 5K, 5L:
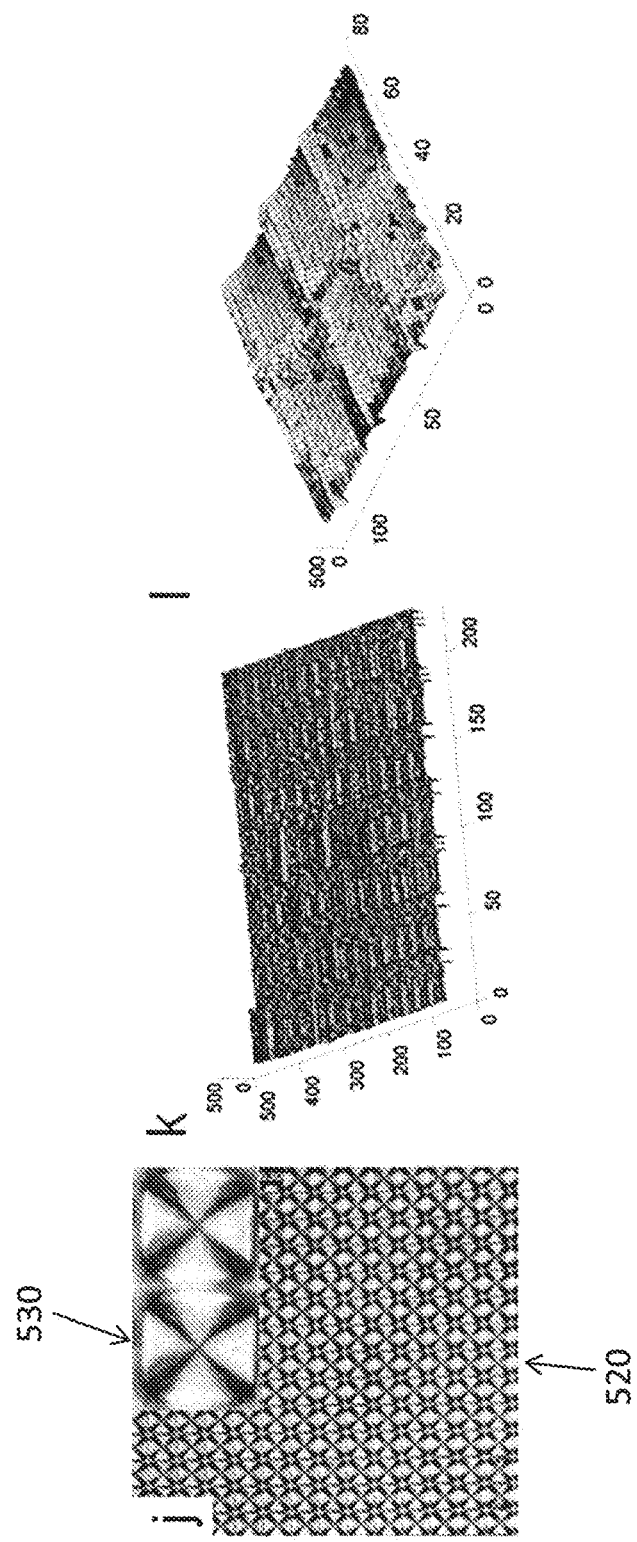

FIGS. 5j to 5l show a process in which each probe tip in the tip array was scanned over an area of 40 µm×40 µm using 32 pixels×32 pixels in scanning in square concave features with a height of 180 nm, a width of 30 µm and a spacing of 10 µm. The PDMS probe tips have a back side length of 30 µm and a spacing of 10 µm respectively.

FIG. 5j shows one of the optical images 520 extracted by a high-speed camera in which 91 probe tips were employed in parallel imaging. The inset part 530 of the figure shows two nearby probe tips.

FIG. 5k shows a 3D topological image of an area of 0.15 $mm^2$ which was obtained utilizing 91 probe tips scanning in parallel.

FIG. 5l shows a 3D topological image on an area of 120 µm by 80 µm selected from the 3D topological image shown in FIG. 5k.

As a proof-of-concept, the probe tip array was brought to scan the surface features with different feature height, such as 260 nm as described above in relation to FIGS. 5d-5i and 180 nm as described above in relation to FIGS. 5j to 5l. The obtained topographical images had good consistence with real surface topography. The feature dimensions measured by this strategy approached the real features dimensions as well. The thermal drift induced slopes on the topographical images could be calibrated by flattening the images as shown in FIGS. 5e to 5h.

Particularly, 3D topographical image over an area of 0.28×0.52 mm could be obtained in one experimental pass by utilizing 91 tips parallel scanning, which extended the scanning area of conventional single tip based AFM (80 µm×80 µm X-Y scanner) by 23 orders of magnitude. The large-area imaging capability of PSOM is potentially suitable to be used in searching for places of interest over large-area sample surfaces.

In embodiments of the present invention the probe tip array can also be used to detect chemical forces and therefore differentiate surfaces with different hydrophobicity, such as hydrophilic and hydrophobic surfaces.

In a demonstration of an embodiment, 3-aminopropyltriethoxysilane (APTES) with the group of —NH2 and octadecyltrimethoxysilane (OTMS) with the group of —CH3 were used to modify the silicon surfaces to make them hydrophilic and hydrophobic respectively.

Figure 6:
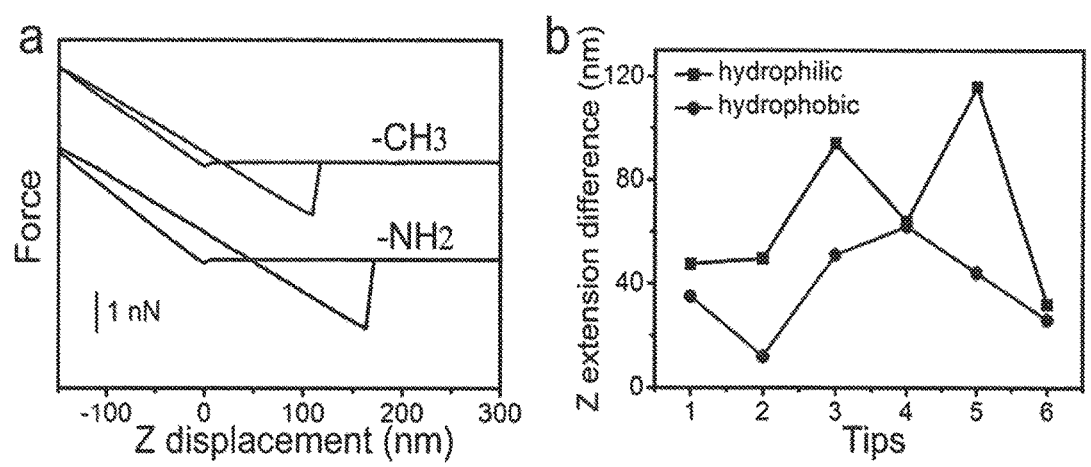
FIGS. 6a and 6b illustrate the use of an embodiment of the present invention to determine surface chemistry of a sample surface.

FIG. 6a shows the representative force versus pull-out distance curves obtained between the same PDMS coated silicon nitride tip and silicon surfaces modified with hydrophilic —$NH_2$ group and hydrophobic —$CH_3$ group respectively.

FIG. 6b shows the average Z extension difference obtained on —$NH_2$ group modified hydrophilic surface and —$CH_3$ group functionalized hydrophobic surface respectively for the selective six tips in the repeated six cycle experiments.

The measured contact angles for —NH2 and —CH3 modified silicon surfaces were 51° and 100° respectively. In order to explore the relative chemical interaction between a PDMS tip and the specimen surfaces with different hydrophobicity, the same oxygen plasma treated PDMS-coated silicon nitride tip was integrated in AFM and brought into contact with abovementioned two specimen surfaces to acquire the pull-out force curves in ambient air shown in FIG. 6a. It turned out that the pull-out force on the hydrophilic surface was larger than that on the hydrophobic surface, indicating the stronger interaction between the PDMS coated hydrophilic tip and the hydrophilic surface. This could be ascribed to the larger meniscus force between two hydrophilic surfaces than that between hydrophilic surface and hydrophobic surface, which is consistent with the previously reported result in chemical force microscopy.

In embodiments of the present invention, the Z piezo extension at critical separation position was larger than that at critical contact position in the same experimental cycle, due to the chemical interaction between PDMS tips and silicon surfaces dragged the elastomeric tips during the separation process, but not the contact process.

The above Z extension value difference between the contact position and the separation position is defined as Z extension difference in this work, which could be used to differentiate the hydrophilic surface and hydrophobic surface. In principle, the Z extension difference on hydrophilic surface is larger than that on hydrophobic surface since the pull-out force on hydrophilic surface is larger than that on hydrophobic surface.

As shown in FIG. 6b, the obtained experimental results agreed well with the predicted results for all the selected six tips, which demonstrates that the chemically enabled PSOM could be used to differentiate the surfaces with different hydrophobicity.

The fabrication and use of embodiments of the present invention will now be described.

The polymer tips were fabricated by conventional photolithography followed by anisotropic wet etching of silicon. (100) Si wafers with 280-nm-thick silicon dioxide were spin-coated with Shipley 1805 (MicroChem) photoresist to fabricate grid patterns by photolithography based on SUSS MJB4 Mask Aligner, Garching. The exposed $SiO_2$ square patterns were etched in a commercially buffered hydrofluoric acid (Transene Company) for 4 min to etch away the unprotected $SiO_2$. The substrate was then put in a wet etching solution (35% wt KOH in $H_2O$: Isopropanol=4:1, v/v) at 80° C. to etch the exposed silicon anisotropically under vigorous stirring, leading to the formation of recessed pyramid patterns. The remaining $SiO_2$ layer was removed by wet etching in buffered hydrofluoric acid (Transene Company). After the molds were soaked in piranha solution ($H_2SO_4/H_2O_2$ (70/30)) at 90 degrees centigrade for 15 min to make them hydrophilic, the Si masters were modified with 1H,1H,2H,2H-perfluorodecyltrichlorosilane (Gelest) by gas-phase silanization to prevent adhesion.

Hard PDMS (h-PDMS) was used for fabricating the polymer probe array. A vinyl-compound-rich prepolymer (VDT-731, Gelest) was mixed with 20 ppm w/w platinum catalyst (platinumdivinyltetramethyldisiloxane complex in xylene, SIP 6831.1, Gelest) and 0.1° A w/w modulator (2,4,6,8-tetramethyltetravinylcyclotetrasiloxane, Fluka). The above obtained vinyl-compound-rich prepolymer (VDT-731, Gelest) was mixed with hydrosilane-rich cross-linker (HMS-301) at the ratio of 3:1 (w/w). After mixing and degassing under vacuum, the mixture was poured on top of the silicon master.

Subsequently, a pre-cleaned glass slide (VWR) was placed on top of the mixture. The elastomer mixture was cured at 80° C. overnight before being peeled off from the silicon master for imaging application.

A 1 $cm^2$ polymer tip array (about 15,000 polydimethylsiloxane (PDMS) tips extending from a flat polymer base) was used for PSOM based on a Park scanning probe lithography system. Although the piezo scanners in SPM system are utilized in this example to allow for the three-dimensional movement of tips with nanometer accuracy, an SPM platform is not necessarily required for PSOM. Probe tips with two different sizes and periodicities were utilized in imaging. One kind of probe tips has the side length of 40 μm and the spacing of 40 μm between adjacent tips. Another kind of probe tips has the side length of 30 μm and the spacing of 10 μm between adjacent tips.

The probe tip array was supported on a rigid and transparent glass slide. A piezo scanner (to move the tips array across a designated area) is located offset from the glass slide so that it does not block the passing of light through the glass slide and the tip array. The transparent glass slide is further adhered to a metal grid frame, which is attached to the edge of the glass slide and hence, does not block light to transmit through the tip array. The metal grid frame was further fixed on a Z-(vertical axis-controls the tip array vertical motion) piezo scanner. The tip array was leveled optically relative to the substrate surface by using an optical microscope positioned above the backside of the tip array to ensure that the tip array plane was parallel to the sample surface plane before imaging. When the tips scanned across the surface, Z piezo lift speed and extension speed were set as the same constant. During the points measurement of features height, Z piezo lift speed and extension speed were set as 100 nm/s, and Z piezo extension changed from 2 μm to −2 μm in the vertical direction.

To obtain the topographical images of lines and areas, Z piezo extension changed from 1.4 μm to −1.4 μm in the vertical direction with the speed of 1 μm/s. The XY stage movement speed was fixed at 100 μm per second. The light source utilized to illuminate the tip array was light-emitting diode white light. The position of the light source is not critical as long as the light is fixed relative to the rest of the setup during imaging process. We use the change of reflection intensity by each tip after contact relative to before contact as the signal to calculate the feature height and explore surface topography. Therefore, the absolute reflection intensity is not critical, only the reflection intensity change is critical. The position of light source may affect the homogeneity of light intensity on different probe tips. But the calculation of feature height is not influenced by the inhomogeneity of incident light intensity across the tip array as long as the incident light intensity does not change before and after contact for each tip.

Two methods were used to calculate the feature height in this work. The movement speed (v) of all probe tips can be predetermined as the same constant since all probe tips are brought to move simultaneously by the same Z piezo scanner. To obtain an image, the probe tips moved from the same beginning position to the same end position in the vertical direction for all tips in all experimental cycles.

Assuming that the first probe tip 212 and the second probe tip 222 in FIG. 2a-i have the same height, the time $t_{ac}$ needed for the first probe tip 212 from the beginning position shown in FIG. 2a to the contact position shown in FIG. 2c at the flat place 210 is shorter than the time $t_{ad}$ required for the second probe tip 222 to move from the same beginning position shown in FIG. 2a to the contact position shown in FIG. 2d at the concave place 220, since the vertically travelled distance from the position shown in FIG. 2a to the position shown in FIG. 2c for the first probe tip 212 is smaller than the vertically travelled distance from the position shown in FIG. 2a to the position shown in FIG. 2d for the second probe tip 222. The height of concave feature 220 relative to the flat place 210 can be calculated by multiplying the time difference between $t_{ac}$ and $t_{ad}$ by the movement speed of the probe array, which is the method 1 for calculation of the feature height.

$$D=(t_{ad}-t_{ac})\times v \qquad (1)$$

With the further extension of Z piezo scanner after the probe tips have contacted with sample surface (the position shown in FIG. 2c for the first probe tip 212), the elastic tips have deformation until they separate with sample surface in the retraction process (the position shown in FIG. 2g for the first probe tip 212). The first probe tip 212 will have travelled the vertical distance ($d_{cg}$) from the contact position shown in in FIG. 2c to the separation position shown in FIG. 2g at flat place 210 is which is larger the distance ($d_{df}$) moved by the second probe tip 222 at the concave place 220 from the contact position shown in FIG. 2d to the separation position shown in FIG. 2f. This distance difference between $d_{cg}$ and $d_{df}$ should be twice the feature height since the probe tips experienced both the extension process and the retraction process. The height of concave feature relative to the flat place can be calculated by multiplying half of the time difference between $t_{cg}$ and $t_{df}$ by the movement speed of the tips, which is the method 2 for calculation of the feature height.

$$D=\tfrac{1}{2}\times(t_{cg}-t_{df})\times v \qquad (2)$$

In FIG. 2, the first probe tip 212 and the second probe tip 222 can also be regarded as two different positions the same tip experienced when scanned at a flat place and a concave place of sample surface respectively. As such, the feature height can be calculated by either the abovementioned method 1 or method 2. After the relative feature height at different scanned points are figured out, topographical images of scanned areas can be presented.

The optical images of the probe tips were captured by a high-speed color camera (Model: acA 2040-180kc) positioned above the backside of the tip array. The high speed camera captured images at the full speed of 187 frames per second with the full resolution of 2046 pixels×2046 pixels. The high speed camera corresponded to the scanning speed. High speed camera is preferably used for faster measurement but a slower camera can be used with a slower corresponding scanning speed. The optical images of tips during the imaging process were recorded by the software of StreamPix 6 into videos. The area chosen to analyze the grayscale in the optical image was a fixed area of 3 pixels×3 pixels around the apex of each tip in the experiment. The reflected light from the apexes of tips was located in the center of backside optical image of the tips.

All the images and data were analyzed by a custom-made matlab program. For example, the videos were analyzed by a custom-made matlab program to obtain the average grayscale value at a selected area for each frame in the videos. After obtained the grayscale curves versus frames, the frame number at the critical contact positions and critical separation positions could be identified by using the matlab program since they were located at the peaks positions. Since the high speed camera captured images at constant speed, the time passed from contact positions to separation positions for every scanned point could be calculated, which could be used to calculate the features height. Subsequently, line profiles across features and 3D topographical images of the features could be presented using matlab program. The grayscale curves were smoothed by using the method of percentile filter before identifying the contact and separation positions.

To investigate the pattern of field enhancement evolution at the interface between tips and the silicon wafer substrate slab, ray tracing simulations of light normally incident on a tips array were calculated using FDTD simulations.

Figure 7:
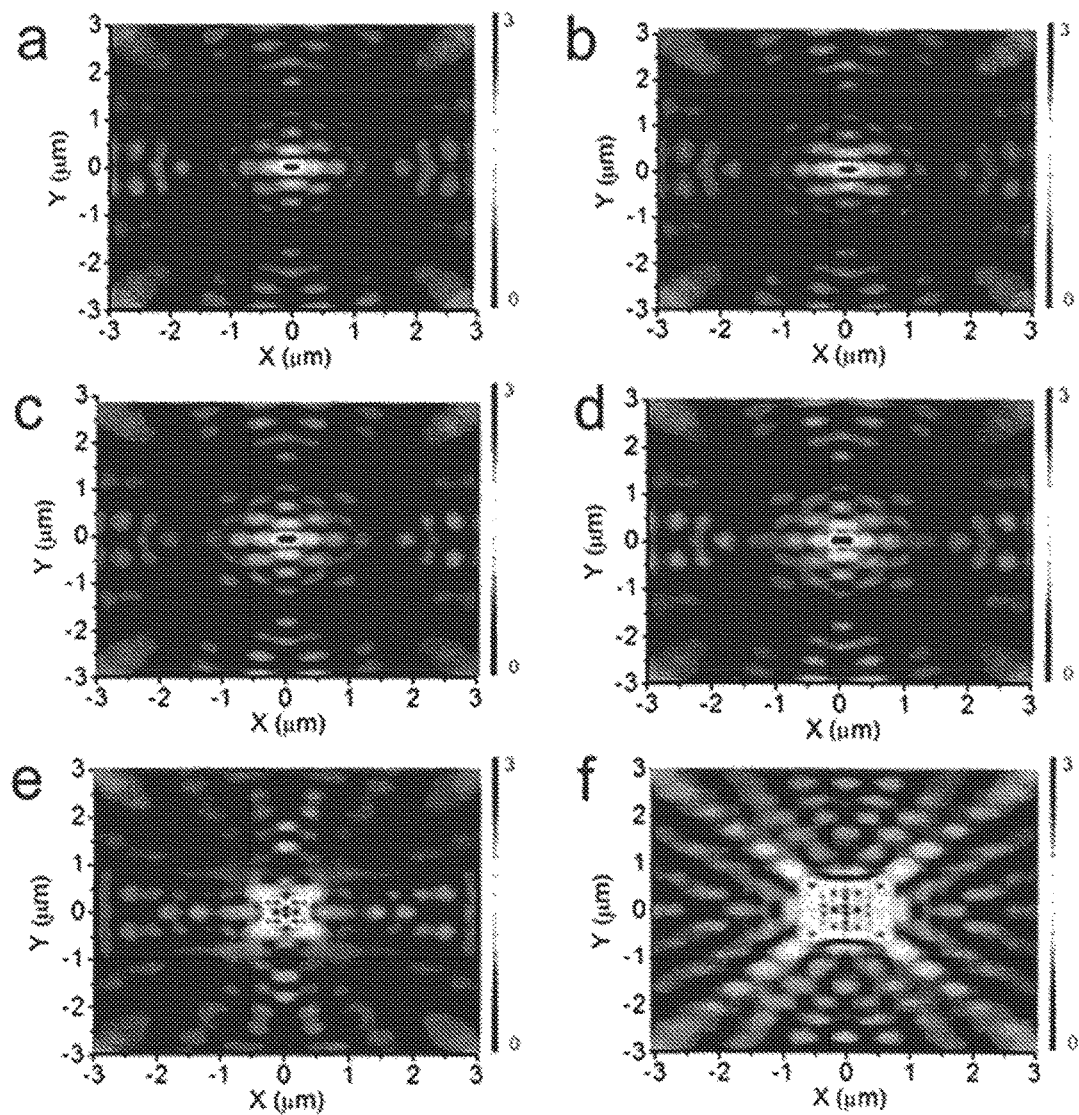
FIGS. 7a to 7f show the results of Near-field intensity profiles generated by Finite-difference time-domain (FDTD) simulations for probe tips in an embodiment of the present invention.

FIGS. 7a to 7e show the results of Near-field intensity profiles generated by Finite-difference time-domain (FDTD) simulations. FIG. 7a shows results with Z piezo extension of 0 nm, FIG. 7b shows results with Z piezo extension of −28 nm, FIG. 7c shows results with Z piezo extension of −128 nm, FIG. 7d shows results with Z piezo extension of −228 nm, FIG. 7e shows results with Z piezo extension of −828 nm, and FIG. 7f shows results with Z piezo extension of −1828 nm. Only the central region with size 6 μm×6 μm is shown for clarity.

The FDTD simulations were performed with a commercial package (Lumerical FDTD solutions v.8.6.3). The refractive index of silicon was adopted from experimental data. The refractive index of PDMS pyramid of 1.4 was used. The pyramid edge size in the simulation was reduced to 8 μm from 30 μm due to the computation limitation. A silicon slab with the size of 10 μm×10 μm×2 μm in X, Y, Z dimensions was put below the PDMS pyramid. The tip moved from the largest Z piezo extension of 2 μm to −2 μm in vertical direction. The Z piezo extension of 0 μm was defined as critical contact position. The distance between tip apex and Si slab decreased from 2000 nm, 1500 nm, 1000 nm, 500 nm, 100 nm, 50 nm, 20 nm, to 0 nm. And then, the apex of the pyramidal tip came to contact to the silicon slab and deformed. The Z piezo extension decreased from 0 to −28, −128, −228, −828 and −1828 nm, with the edge length of tip apex increased from 0.0001, 40, 182, 322, 1172, to 2588 nm respectively. The light polarization was parallel to the edge of the pyramid. The wavelength of incident light was ~200-1000 nm. A horizontal 2D monitor was placed at the top of tip plane and Si slab plane to obtain the local intensity profile. The local light field intensity at the interface between tip and silicon slab was profiled via 2D monitors. As shown in FIGS. 7a to 7f, the area of high intensity region increased with the increased dimension of tip's top span.

Figure 8:
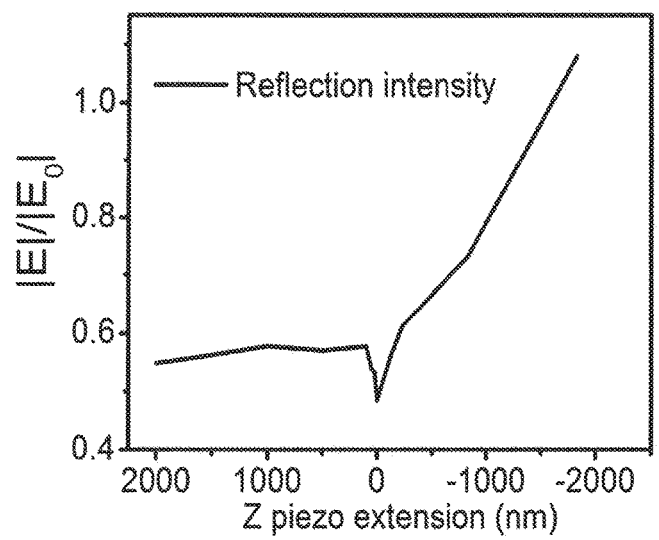
FIG. 8 shows the near-field reflection intensity profile evolution with distance change for an embodiment of the present invention.

FIG. 8 shows the near-field reflection intensity profile evolution with distance change. Significantly, a peak with sharp peak valley appeared at the critical contact position, which may assist in the correct identification of contact peak in this approach.

Figure 9:
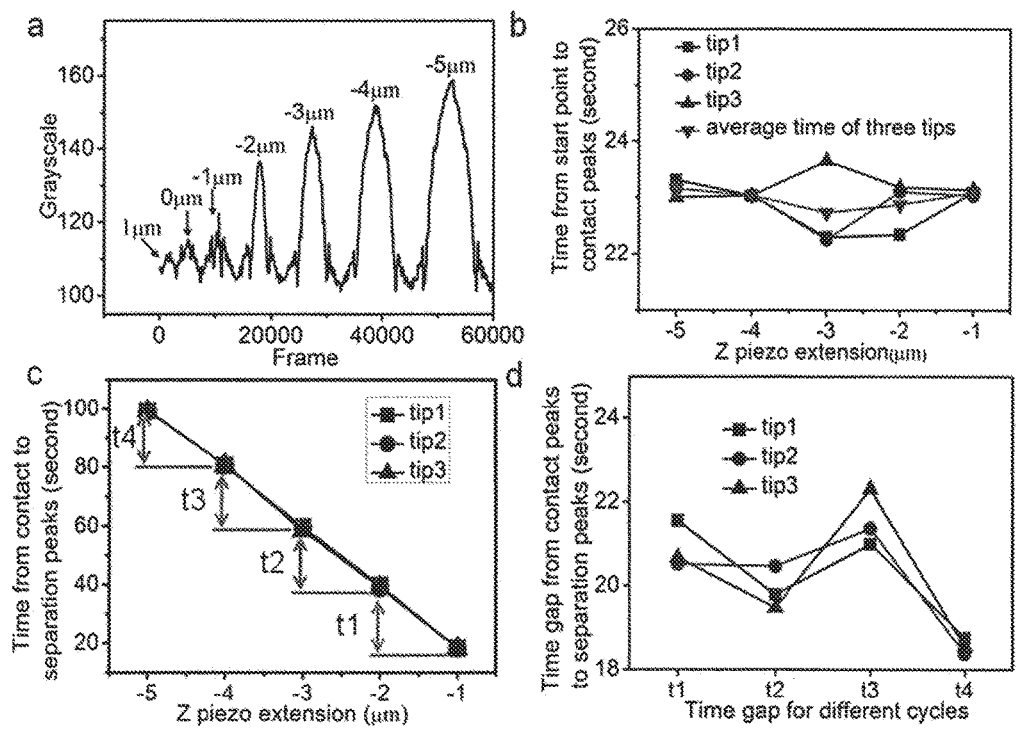
FIGS. 9a to 9d show a process of confirming contact and separation peaks by varying the minimal Z piezo extension.

FIGS. 9a to 9d show the process of confirming contact and separation peaks by varying the minimal Z piezo extension. In order to identify the existence and the positions of the contact peak and the separation peak, the tips were brought to contact the same places with linearly decreased minimal Z piezo extension from 1 µm to −5 µm for consecutive seven cycles FIG. 9a shows the grayscale change of a probe tip (tip 1) as a function of the frame number from the beginning of video recording. In the consecutive seven experimental cycles, the maximal Z piezo extension was 2 µm. However, the minimal Z piezo extension decreased linearly from 1 µm to −5 µm with the step of 1 µm from the first cycle to the seventh cycle. As shown in FIG. 9a there were no apparent contact peaks and separation peaks appeared when the minimal Z piezo extension was 1 µm, since non-contact happened between the tips and surface. However, with the minimal Z piezo extension decreased to 0 µm or lower, the contact peaks and separation peaks appeared, indicating that the contact between the tips and sample surface occurred. With the decrease of minimal Z piezo extension in the seven cycles, the maximal grayscale in each cycle increased monotonously, owning to that the contacted area between tips and surface increased monotonously at the minimal Z piezo extension positions.

FIG. 9b shows the time passed from the beginning positions to the contact peaks for each tip from the third cycle to the seventh cycle, and the average time passed from the beginning positions to the contact peaks for the three tips in each cycle. Because the distance from the beginning position to sample surface in the vertical direction was constant for different minimal Z piezo extension in the seven cycles, the time from the beginning position to the contact peaks was nearly unchanged (around 23 s) for the decrease of minimal Z piezo extension in different cycles.

FIG. 9c shows the time passed from the contact peak to the separation peak for each tip in each cycle. The t1 corresponded the time difference between the third cycle (minimal Z extension −1 µm) and the fourth cycle (minimal Z extension −2 µm) in terms of the time passed from the contact peak to the separation peak for the same tip, and so forth for t2, t3, t4. As shown in FIG. 9c, the time from contact positions to the separation positions increased linearly with the decrease of minimal Z piezo extension, resulting in the prolonged contact process FIG. 9d shows the detailed time difference value (t1, t2, t3, t4) for each tip in shown in FIG. 9c. As shown in FIG. 9d, the difference of time period from contact peaks to separation peaks between adjacent experimental cycles was nearly the same (20 s), which was consistent with the expected result. As the tips moved distance from the contact peaks to the separation peaks increased 2 µm from one cycle to the next cycle, and the tips movement speed was 100 nm per second, the different of time period should be 20 s. It was also demonstrated that both of the aforementioned two methods for calculation of the feature height were feasible.

The preparation of the patterns with different feature height by photolithography will now be described. Si/SiO$_2$ (100) wafers with a 260-nm-thick silicon dioxide coating were spin coated with a layer of photoresist (AZ 1518) at 4000 rpm for 30 seconds and subsequently baked at 90° C. for 3 min on a hot plate. The square well arrays were fabricated by photolithography using a custom-made chrome mask. The photoresist patterns were developed in MF 319 developer for 30 seconds, washed with water, dried with nitrogen flow, and exposed to O$_2$ plasma for 30 s (200 mTorr) to remove the residual organic layer. The above obtained samples were immersed in commercially buffered hydrofluoric acid (Transene Company) to etch silicon dioxide for different time in order to produce the features with different depth. In order to obtain the features with the height of 260 nm, 180 nm, 55 nm, 10 nm, the etching time was carefully controlled to be 2.5 min, 1.5 min, 27 s and 5 s respectively. After etching, copious MiliQ water was employed to rinse the surface. Subsequently, the samples were put in acetone under sonication to remove the photoresist on the sample surfaces.

FIGS. 10a to 10f show AFM topographical images of concave features with different dimensions measured by PSOM.

Figure 10:
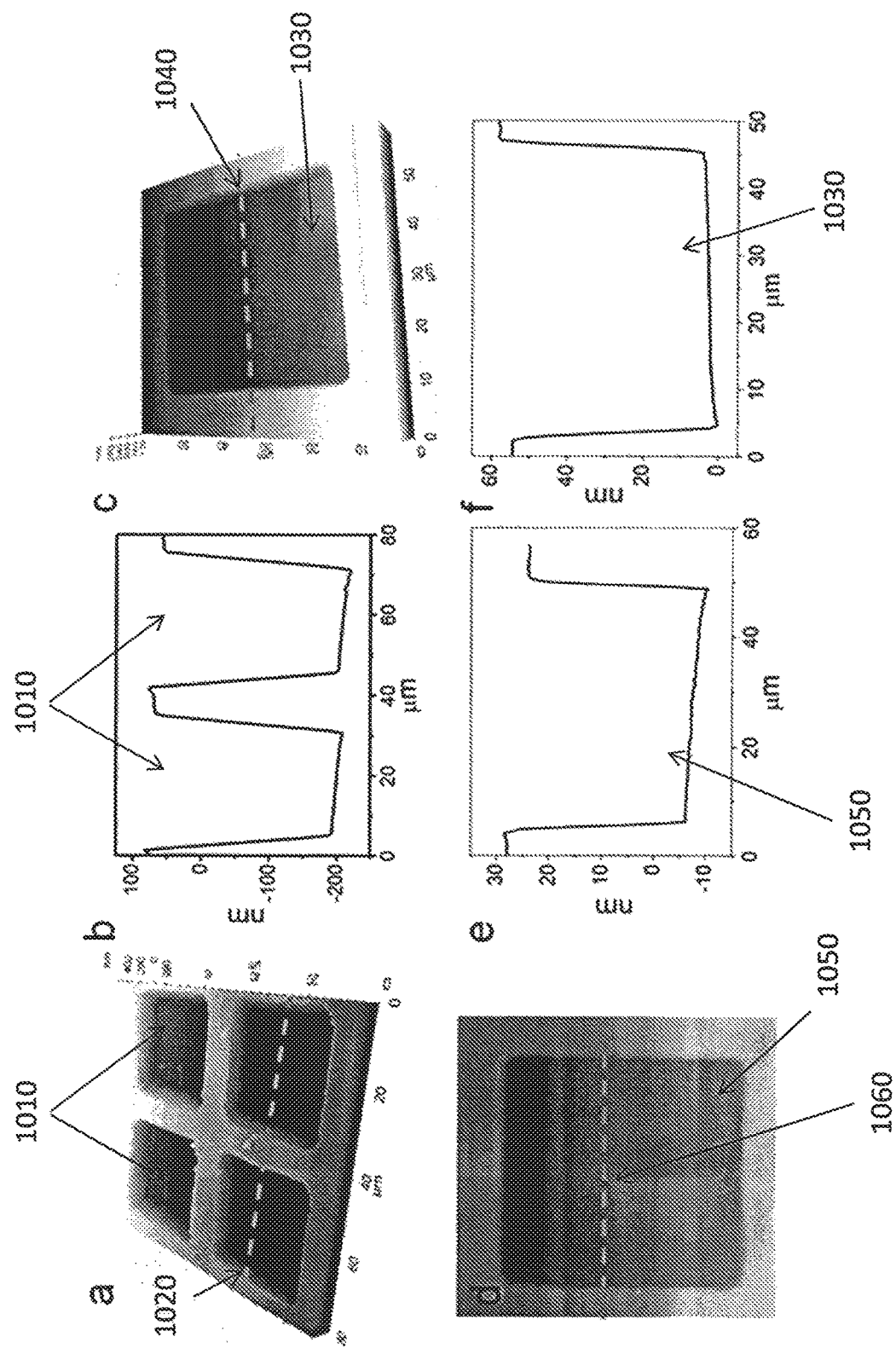
FIGS. 10a to 10f show AFM topographical images of concave features with different dimensions measured by PSOM.

FIG. 10a shows a topographical image of the concave square features 1010 with the depth of 260 nm, the side length of 30 µm and the spacing of 10 µm.

FIG. 10b shows the AFM height profile of one line 1020 across the features 1010 shown in FIG. 10a. FIG. 10b demonstrates that the features had the height of 260 nm and the side length of 30 µm.

FIG. 10c shows a topographical image of concave square features 1030 with the depth of 55 nm and the side length of 40 µm.

FIG. 10d shows Two-dimensional topographical image of concave square feature 1050 with the depth of 35 nm and the side length of 40 µm.

FIG. 10e shows a AFM height profile of a line 1060 across the features 1050 shown in FIG. 10d demonstrating that the concave feature 1050 have a height of 35 nm.

FIG. 10f shows a AFM height profile of a line 1040 across the feature 1030 shown in FIG. 10c demonstrating that the concave features had a height of 55 nm.

The procedures to coat silicon nitride tip with PDMS184 will now be described. PDMS elastomer and cross-linker (Sylgard 184, dow Corning) (10:1, w/w) were completely mixed. A droplet of this mixture was dropped and spread out on the cleaned silicon surface by spin-coating (2000 rpm for 20 s). A cleaned Si$_3$N$_4$ tip, which was mounted into an AFM tip holder, was brought to approach the above droplet on silicon surface by AFM (Park XEP, Park Systems Co.). Immediately after the approach, the tip was retracted from the surface. Subsequently, the above mixture coated Si$_3$N$_4$ tip was removed from the tip holder and cured at 60-70° C. for 3 h. After curing, the PDMS coated tips could be used in the force versus Z piezo extension experiment.

The procedures of preparing the hydrophilic and hydrophobic silicon surfaces will now be described. Firstly, the silicon slides were soaked in Piranha solution (H$_2$SO$_4$/H$_2$O$_2$ (70/30)) at 90° C. for 1 hour, then rinsed with water, and dried with nitrogen. To prepare the hydrophobic surfaces, the cleaned slides were subsequently placed vertically in a 5% solution (v/v) of OTMS in toluene with 0.5% n-butylamine at room temperature for 1 hour without touching each other. Subsequently, the slides were washed with toluene and then acetone several times under sonication. To prepare the hydrophilic surface, the cleaned slides were subsequently placed vertically in a 1% solution (VN) of APTES in ethanol solution for 1 hour without touching each other.

The slides were subsequently washed with ethanol for several times under sonication.

The effect of selected area size around the apexes of the probe tips for calculation of the grayscale on the accuracy of feature height measurement was investigated. This is shown in FIGS. 11a to 11d.

Figure 11:
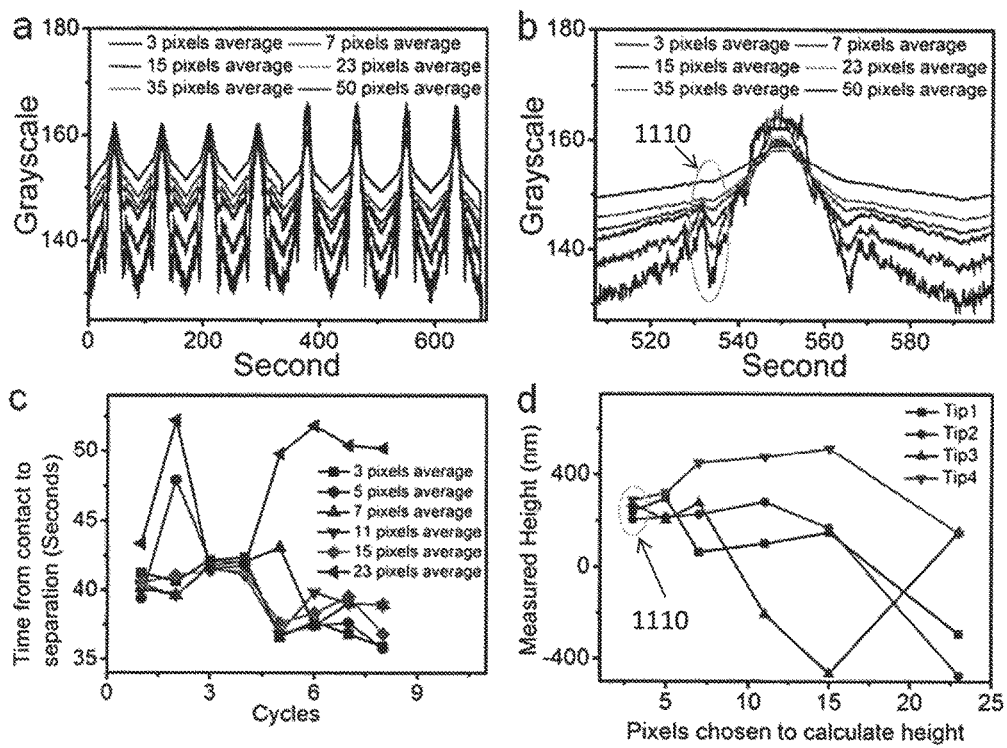
FIGS. 11a to 11d show the effect of selected area size around the apexes of the probe tips for calculation of the grayscale on the accuracy of feature height measurement for embodiments of the present invention.

FIG. 11a shows the grayscale of a selected tip as a function of time passed in consecutive eight cycles when the areas of $3^2$ pixels$^2$, $7^2$ pixels$^2$, $15^2$ pixels$^2$, $23^2$ pixels$^2$, $35^2$ pixels$^2$ and $50^2$ pixels$^2$ around the tip apex were chosen to analyze the grayscale respectively. The grayscale on the curve is the average grayscale value across the above mentioned areas. As shown in FIG. 11a it was found that the baseline of grayscale increased with the extension of areas chosen to analyse the grayscale. This was attributed to the larger reflection outside the tips apexes than the tips apexes.

FIG. 11b shows the grayscale as a function of time for different analysed area size in one selected cycle shown in FIG. 11a. The circled region 1110 shows the peaks. As shown in FIG. 11b, the contact peaks and separation peaks became blurry with the increased areas chosen to analyse the grayscale. The grayscale curves have the sharpest contact peaks and separation peaks when the areas of 3 pixels×3 pixels (corresponding to 1.51 µm$^2$) were chosen to analyse the grayscale.

FIG. 11c shows the time from contact peaks to separation peaks obtained for different area size.

FIG. 11d shows the measured height for 260 nm high features by analyzing the grayscale value over different areas size for four selected tips. One pixel in the image corresponded to the feature size of 0.41 µm on the PDMS surface.

As shown in FIG. 11d, the measured height for the 260-nm-height feature had the smallest error when the areas of 3 pixels×3 pixels were chosen to calculate the average grayscale. The measured error increased as the selected areas enlarged. Thus, the areas of 3 pixels×3 pixels around the apex of each tip were chosen to get the average grayscale value throughout the work. This region 1110 is highlighted in FIG. 11d.

FIGS. 12a to 12f show the use of PSOM to differentiate micrometer sized regions with different hydrophobicity on the same substrate. PSOM could be utilized to investigate surface chemistry at micrometer sized regions based on the Z extension difference.

Figure 12:
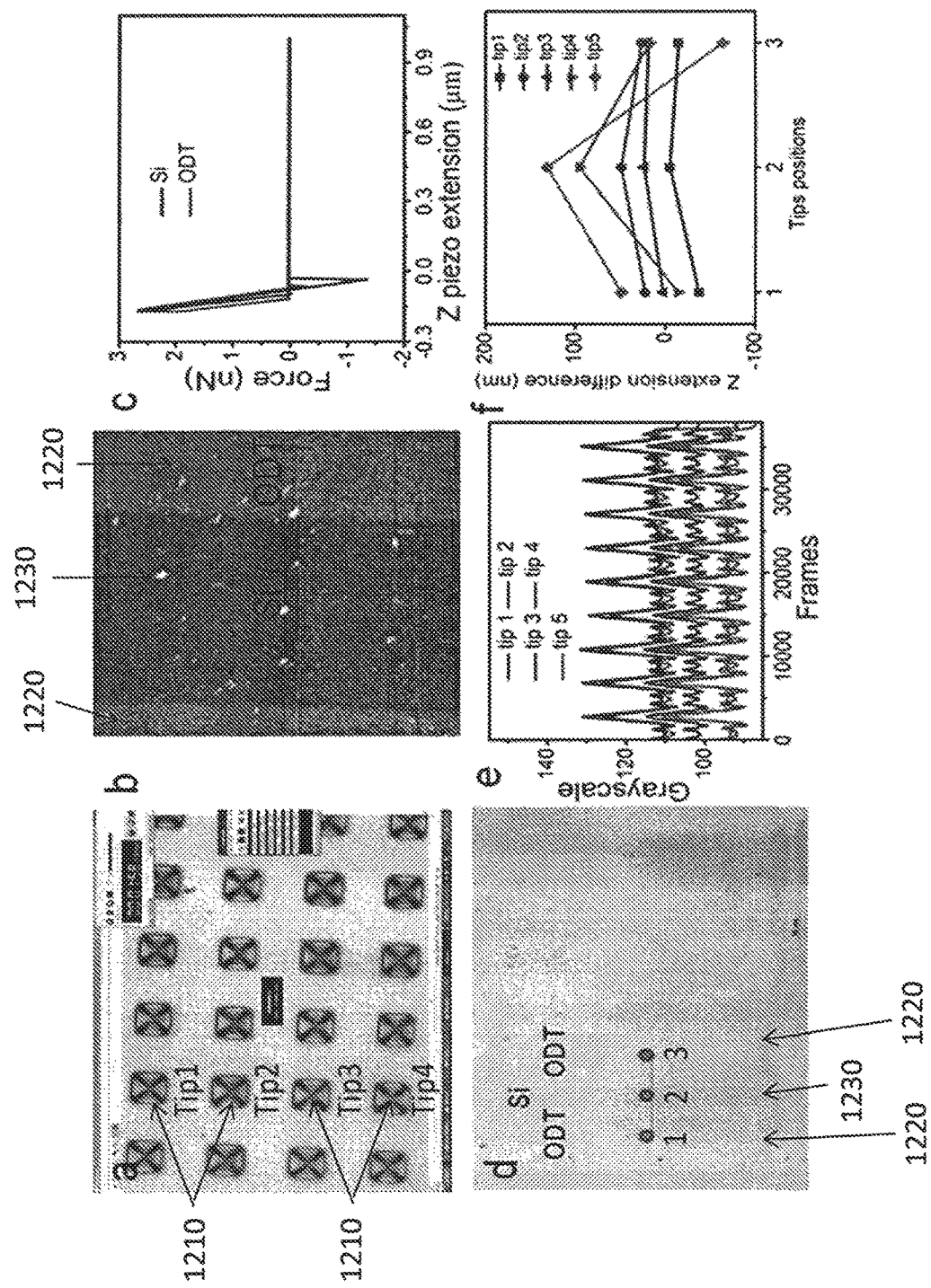
FIGS. 12a to 12f show the use of an embodiment of the present invention to differentiate micrometer sized regions with different hydrophobicity on the same substrate.

FIG. 12a shows optical images of a tip array consisting of 24 probe tips 1210 which was scanned across the surface with the micro-sized regions of different hydrophobicity.

FIG. 12b shows an AFM phase image showing that 1-octadecanethiol (ODT) modified gold surface 1220 and silicon surface 1230 exhibited different phase contrast. After coating silicon surface with a thin layer of gold (10 nm in thickness), micro-contact printing was utilized to pattern self-assembled monolayer 1-octadecanethiol (ODT) molecules on the gold surface. After etching away the gold at un-protected regions, micrometer sized regions with different hydrophobicity formed. The ODT-modified gold surface 1220 exhibited hydrophobic characteristic, while the silicon surface 1230 was hydrophilic.

FIG. 12c shows representative force versus pull-out distance curves obtained between PDMS coated silicon nitride tip and ODT modified gold surface and silicon surface respectively. It was demonstrated that the adhesion force between hydrophilic tips and hydrophilic silicon surface was larger than that between the same tip and ODT modified hydrophobic gold surface. As shown in FIG. 12c, the adhesion force on hydrophilic silicon surface was larger than that on hydrophobic ODT modified gold surface, which demonstrated that the interaction between oxygen plasma treated hydrophilic PDMS tip and silicon surface was larger than that between the same tip and ODT modified gold surface.

FIG. 12d shows an optical image of the substrate with visible micro-sized regions of different materials. The bright stripe corresponded to the regions with ODT-modified gold surface 1220. The dark stripe corresponded to the silicon surface 1230.

Firstly, the tips were brought to contact with position 1 at the ODT modified gold surface for consecutive three times. Then the tips moved to contact with position 2 at the silicon surface for consecutive three times. Finally, the tips were brought to contact with position 3 at the ODT modified gold surface for three times again. Since there was apparent contrast between gold surface and silicon surface under optical microscope, the five tips (tip 1 to tip 5) were brought to contact with ODT-modified hydrophobic regions, hydrophilic silicon regions and ODT-modified hydrophobic regions in sequence under optical microscope.

FIG. 12e shows the grayscale as a function of frame number for the selected five tips in nine experimental cycles.

FIG. 12f shows the calculated Z extension difference as a function of tip positions for the selected five tips. As shown in FIG. 12f, it was found that the Z extension difference increased when the tips moved from ODT surface to silicon surface, followed by the decrease of Z extension when the tips moved from silicon surface to ODT surface.

As described above, it was demonstrated that the tips could be utilized to differentiate micrometer sized regions with different chemical functionality. The grayscale curves on gold surface and silicon surface had similar shapes, suggesting that PSOM could be employed to explore the topography and surface chemistry on different materials surfaces.

Whilst the foregoing description has described exemplary embodiments, it will be understood by those skilled in the art that many variations of the embodiments can be made within the scope of the present invention as defined by the appended claims.

The invention claimed is:

1. An apparatus for investigating a sample surface, the apparatus comprising:
    a probe array comprising a substrate and a plurality of probe tips extending from the substrate, the probe tips comprising a transparent and deformable material and configured to contact the sample surface;
    an actuator configured to move the probe array towards the sample surface;
    a light source configured to illuminate the probe tips with an illumination through the substrate; and
    an image capture device arranged to detect a change in intensity of the illumination reflected from the probe tips.

2. An apparatus according to claim 1 wherein the probe tips comprise an elastomer.

3. An apparatus according to claim 2, wherein the probe tips comprise polydimethylsiloxane (PDMS).

4. An apparatus according to claim 1, wherein the actuator is configured to move the probe array towards the sample surface and away from the sample surface.

5. An apparatus according to claim 1, further comprising an XY scanning stage configured to scan the probe array parallel to the sample surface.

6. An apparatus according to claim 1, wherein the probe tips of the probe array have a length of between 1 µm and 500 µm.

7. An apparatus according to claim 1, wherein the actuator is configured to move the probe array towards and/or away from the sample surface at a speed in the range of 0.1 µm/s to 2000 µm/s.

8. An apparatus according to claim 1, wherein the actuator is configured to move the probe array towards and/or away from the sample surface through a distance of 0 µm to 50 µm.

9. A method of investigating a sample surface, the method comprising
arranging a probe array over the sample surface, the probe array comprising a substrate and a plurality of probe tips from the substrate, the probe tips comprising a transparent and deformable material and configured to contact the sample surface;
illuminating the probe tips with an illumination through the substrate;
moving the probe array relative to the sample surface;
detecting a timing of a change in intensity of the illumination reflected from each probe tip of the plurality of probe tips; and
determining a property of the sample surface from the timing of the change in intensity of the illumination reflected from each probe tip of the plurality of probe tips.

10. A method according to claim 9, wherein the property of the sample surface is a topology of the sample surface.

11. A method according to claim 9, wherein the property of the sample surface is a surface chemistry of the sample surface.

12. A method according to claim 9, wherein moving the probe array relative to the sample surface comprises moving the probe array towards the sample surface and moving the probe array away from the sample surface and wherein detecting a timing of a change in intensity of the illumination reflected from each probe tip of the plurality of probe tips comprises detecting a timing of a first change in intensity corresponding to that probe tip coming into contact with the sample surface and detecting a timing of a second change in intensity corresponding to that probe tip coming out of contact with the probe surface.

13. A method according to claim 9, further comprising scanning the probe array across the sample surface.

14. A method according to claim 9, wherein detecting a timing of change in intensity of the illumination reflected from each probe tip of the plurality of probe tips comprises monitoring an area corresponding to each probe tips of less than 25×25 pixels.

* * * * *